(12) United States Patent
Lee et al.

(10) Patent No.: US 11,336,390 B2
(45) Date of Patent: May 17, 2022

(54) METHOD FOR TRANSMITTING DOWNLINK CONTROL INFORMATION IN WIRELESS COMMUNICATION SYSTEM AND DEVICE USING SAME

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 532 days.

(21) Appl. No.: 16/328,658

(22) PCT Filed: Aug. 30, 2017

(86) PCT No.: PCT/KR2017/009510
§ 371 (c)(1),
(2) Date: Feb. 26, 2019

(87) PCT Pub. No.: WO2018/044080
PCT Pub. Date: Mar. 8, 2018

(65) Prior Publication Data

US 2021/0282165 A1  Sep. 9, 2021

Related U.S. Application Data

(60) Provisional application No. 62/450,580, filed on Jan. 26, 2017, provisional application No. 62/420,732, (Continued)

(51) Int. Cl.
*H04L 1/00* (2006.01)
*H04W 72/12* (2009.01)
(Continued)

(52) U.S. Cl.
CPC .............. *H04L 1/001* (2013.01); *H04L 1/0008* (2013.01); *H04W 72/12* (2013.01);
(Continued)

(58) Field of Classification Search
None
See application file for complete search history.

(56) References Cited

U.S. PATENT DOCUMENTS

2011/0134874 A1   6/2011   Nakao et al.
2011/0205995 A1   8/2011   Grovlen
(Continued)

FOREIGN PATENT DOCUMENTS

CN   104904155   9/2015
CN   105246025   1/2016
(Continued)

OTHER PUBLICATIONS

Qualcomm Incorporated, "Details of Resource Pool Design", R1-166260, Aug. 26, 2016 (Year: 2016).*
(Continued)

*Primary Examiner* — Jenkey Van
(74) *Attorney, Agent, or Firm* — Lee, Hong, Degerman, Kang & Waimey PC

(57) ABSTRACT

Provided are a method for transmitting downlink control information (DCI) in a wireless communication system and a device using same. The method enables determining the size of a first DCI format and adjusting the size of a second DCI format so as to be the same as the size of the first DCI format, wherein the first DCI format and the second DCI format are DCI formats sharing the same search space regardless of whether the formats are for the same serving cell.

15 Claims, 17 Drawing Sheets

Related U.S. Application Data filed on Nov. 11, 2016, provisional application No. 62/416,714, filed on Nov. 3, 2016, provisional application No. 62/384,163, filed on Sep. 6, 2016, provisional application No. 62/383,385, filed on Sep. 2, 2016, provisional application No. 62/382,311, filed on Sep. 1, 2016, provisional application No. 62/381,634, filed on Aug. 31, 2016, provisional application No. 62/381,055, filed on Aug. 30, 2016.

(51) Int. Cl.
*H04W 92/18* (2009.01)
*H04W 4/46* (2018.01)
*H04W 72/04* (2009.01)

(52) U.S. Cl.
CPC ... *H04W 72/1263* (2013.01); *H04W 72/1289* (2013.01); *H04W 4/46* (2018.02); *H04W 72/0406* (2013.01); *H04W 92/18* (2013.01)

(56) References Cited

U.S. PATENT DOCUMENTS

| | | | |
|---|---|---|---|
| 2012/0320838 | A1 | 12/2012 | Yang et al. |
| 2013/0016672 | A1* | 1/2013 | Yang ............... H04L 5/0053 370/329 |
| 2014/0003262 | A1 | 1/2014 | He et al. |
| 2015/0117336 | A1 | 4/2015 | Huss et al. |
| 2015/0319633 | A1* | 11/2015 | Ji ..................... H04W 24/08 370/252 |
| 2016/0066337 | A1 | 3/2016 | Sartori et al. |
| 2017/0245313 | A1 | 8/2017 | Kim et al. |
| 2017/0353285 | A1* | 12/2017 | Yang ............... H04L 5/00 |
| 2018/0049217 | A1* | 2/2018 | Dinan .............. H04W 72/048 |
| 2018/0139724 | A1* | 5/2018 | Loehr .............. H04W 72/02 |
| 2019/0029006 | A1* | 1/2019 | Wang ............... H04W 72/1289 |
| 2019/0045337 | A1* | 2/2019 | Sun ................. H04W 4/00 |
| 2019/0200377 | A1 | 6/2019 | Li et al. |

FOREIGN PATENT DOCUMENTS

| | | |
|---|---|---|
| CN | 105515721 | 4/2016 |
| EP | 3247061 | 11/2017 |
| JP | 2018512009 | 4/2018 |
| KR | 20160014768 | 2/2016 |
| WO | 2014116078 | 7/2014 |
| WO | 2015149213 | 10/2015 |
| WO | 2016028059 | 2/2016 |
| WO | 2016045409 | 3/2016 |
| WO | 2016114560 | 7/2016 |
| WO | 2016165124 | 10/2016 |

OTHER PUBLICATIONS

Panasonic, "Discussion on DCI design in V2V", 3GPP TSG RAN WG1 Meeting #86, R1-166970, Aug. 26, 2016 (Year: 2016).*
U.S. Appl. No. 16/328,674, Office Action dated Jun. 26, 2020, 19 pages.
Ericsson, "Subchannelization and measurements for sensing for V2V over PC5," 3GPP TSG RAN WG1 Meeting #86, R1-167013, Gothenburg, Sweden, Aug. 22-26, 2016, 4 pages.
U.S. Appl. No. 16/328,674, Office Action dated Mar. 4, 2021, 16 pages.
U.S. Appl. No. 16/328,674, Final Office Action dated Jun. 15, 2021, 12 pages.
PCT International Application No. PCT/KR2017/009510, International Search Report dated Nov. 23, 2017, 4 pages.
Huawei, HiSilicon, "DCI for D2D communication mode 1," 3GPP TSG-RAN #78, R1-142840, Aug. 2014, 6 pages.
Qualcomm Incorporated, "Details of DCI and SPS configuration," 3GPP TSG-RAN WG1 #86, R1-166261, Aug. 2016, 7 pages.
Panasonic, "Discussion on DCI design in V2V," 3GPP TSG-RAN WG1 #86, R1-166970, Aug. 2016, 6 pages.
Japan Patent Office Application No. 2019-511983, Office Action dated May 26, 2020, 3 pages.
Korean Intellectual Property Office Application No. 10-2019-7004655, Notice of Allowance dated Jan. 20, 2020, 2 pages.
European Patent Office Application Serial No. 17847004.3, Search Report dated Mar. 4, 2020, 12 pages.
Huawei, et al., "Discussion on SCI contents for V2V", 3GPP TSG RAN WG1 Meeting #85, R1-164103, May 2016, 6 pages.
Qualcomm, "Details of SCI", 3GPP TSG RAN WG1 Meeting #86, R1-166262, Aug. 2016, 5 pages.
LG Electronics, "Remaining issues on SCI contents", 3GPP TSG RAN WG1 Meeting #86, R1-166831, Aug. 2016, 3 pages.
Ericsson, "Contents of Downlink Control Information for V2V over PC5", 3GPP TSG RAN WG1 Meeting #86, R1-166957, Aug. 2016, 3 pages.
Huawei, "Introduction of V2V into TS36.212 (skeleton)", 3GPP TSG RAN WG1 Meeting #86, R1-166223, Aug. 2016, 9 pages.
Huawei, et al., "Scheduling assignment design for V2V", 3GPP TSG RAN WG1 Meeting #86, R1-166202, Aug. 2016, 4 pages.
Ericsson, "Contents of PSCCH for V2V over PC5", 3GPP TSG RAN WG1 Meeting #86, R1-167011, Aug. 2016, 3 pages.
U.S. Appl. No. 16/328,674, Office Action dated Sep. 22, 2021, 19 pages.
European Patent Office Application Serial No. 17847005.0, Search Report dated Mar. 24, 2020, 15 pages.
Japan Patent Office Application No. 2019-511958, Office Action dated Mar. 31, 2020, 2 pages.
LG Electronics, et al., "WF on remaining details of V2X UL and SL DCI design", 3GPP TSG RAN WG1 Meeting #88, R1-1703692, Feb. 2017, 5 pages.
Huawei, "Introduction of V2V into TS36.212", 3GPP TSG RAN WG1 Meeting #86, R1-168224, Aug. 2016, 8 pages.
Nokia, "Chairman's Notes of Agenda Item 7.2.2 on Support for V2V services based on LTE sidelink", 3GPP TSG RAN WG1 Meeting #86, R1-168403, Aug. 2016, 11 pages.
Qualcomm, "PD2DSCH Content and Design", 3GPP TSG RAN WG1 Meeting #78bis, R1-143976, Oct. 2014, 6 pages.
State Intellectual Property Office of the People's Republic of China Application Serial No. 201780052773.6, Office Action dated Sep. 3, 2021, 9 pages.
State Intellectual Property Office of the People's Republic of China Application Serial No. 201780052436.7, Office Action dated Sep. 3, 2021, 8 pages.
Ericsson, "Contents of PSCCH for V2V over PC5," R1-162827, 3GPP TSG RAN WG1 Meeting #84bis, Apr. 2016, 4 pages.

* cited by examiner

METHOD FOR TRANSMITTING DOWNLINK CONTROL INFORMATION IN WIRELESS COMMUNICATION SYSTEM AND DEVICE USING SAME

CROSS-REFERENCE TO RELATED APPLICATIONS

This application is the National Stage filing under 35 U.S.C. 371 of International Application No. PCT/KR2017/009510, filed on Aug. 30, 2017, which claims the benefit of U.S. Provisional Application No. 62/381,055, filed on Aug. 30, 2016, 62/381,634, filed on Aug. 31, 2016, 62/382,311, filed on Sep. 1, 2016, 62/383,385, filed on Sep. 2, 2016, 62/384,163, filed on Sep. 6, 2016, 62/416,714, filed on Nov. 3, 2016, 62/420,732, filed on Nov. 11, 2016, and 62/450,580, filed on Jan. 26, 2017, the contents of which are all hereby incorporated by reference herein in their entireties.

BACKGROUND OF THE INVENTION

Field of the Invention

The present invention relates to wireless communications, and more particularly, relates to a method for transmitting downlink control information in a wireless communication system and an apparatus using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3$^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

The 3GPP has been conducting studies on V2X as one study item (SI) for LTE Release 14. V2X refers to vehicle-to-everything communication and includes V2V, that is, vehicle-to-vehicle communication.

Among various methods for performing V2V communication, there is a method in which a base station (BS) schedules a resource for V2V communication. When this method is used, a BS transmits a new type of downlink control information for V2V communication to a user equipment (UE).

A method for configuring downlink control information for V2V communication is need which is capable of minimizing an increase in the number of times of blind decoding by a UE without considerably increasing complexity.

SUMMARY OF THE INVENTION

An aspect of the present invention is to provide a method for transmitting downlink control information in a wireless communication system, and an apparatus using the same.

In one aspect, provided is a method for transmitting downlink control information (DCI) in a wireless communication system. The method includes determining a size of a first DCI format and adjusting a size of a second DCI format to be equal to the size of the first DCI format. The first DCI format and the second DCI format are DCI formats sharing the same search space regardless of the DCI formats are for the same serving cell.

The first DCI format may be a DCI format used for sidelink semi-persistent scheduling, and the second DCI format may be a DCI format used for sidelink dynamic scheduling. In this case, DCI format 0 may not be transmitted in the search space.

The first DCI format may be DCI format 0 used for scheduling of a physical uplink shared channel (PUSCH).

The second DCI format may be DCI format 5A used for scheduling of a physical sidelink control channel (PSCCH).

The first DCI format and the second DCI format may be DCI formats for scheduling physical channels of different serving cells.

The first DCI format and the second DCI format may share the same search space by having the same carrier indication field (CIF) value.

When the second DCI format is DCI format 5A, a payload size of DCI format 5A may vary depending on a number of subchannels configured for a user equipment.

The subchannels may compris a plurality of contiguous resource blocks (RBs).

When the first DCI format is DCI format 0 and the second DCI format is DCI format 5A, the DCI format 5A having a greater size than that of the DCI format 0 is not transmitted in the search space.

In another aspect, provided is a device for transmitting downlink control information (DCI) in a wireless communication system. The device includes a radio frequency (RF) unit to transmit and receive a radio signal and a processor connected to the RF unit to operate. The processor determines a size of a first DCI format and adjusts a size of a second DCI format to be equal to the size of the first DCI format, and the first DCI format and the second DCI format are DCI formats sharing the same search space regardless of the formats are for the same serving cell.

In configuring downlink control information for V2V communication, it is possible to prevent complexity in UE implementing V2X communication from being considerably increased. For example, it is possible to minimize or prevent an increase in the number of times of blind decoding by a UE for detecting downlink control information for V2X communication.

DESCRIPTION OF EXEMPLARY EMBODIMENTS

Figure 1:
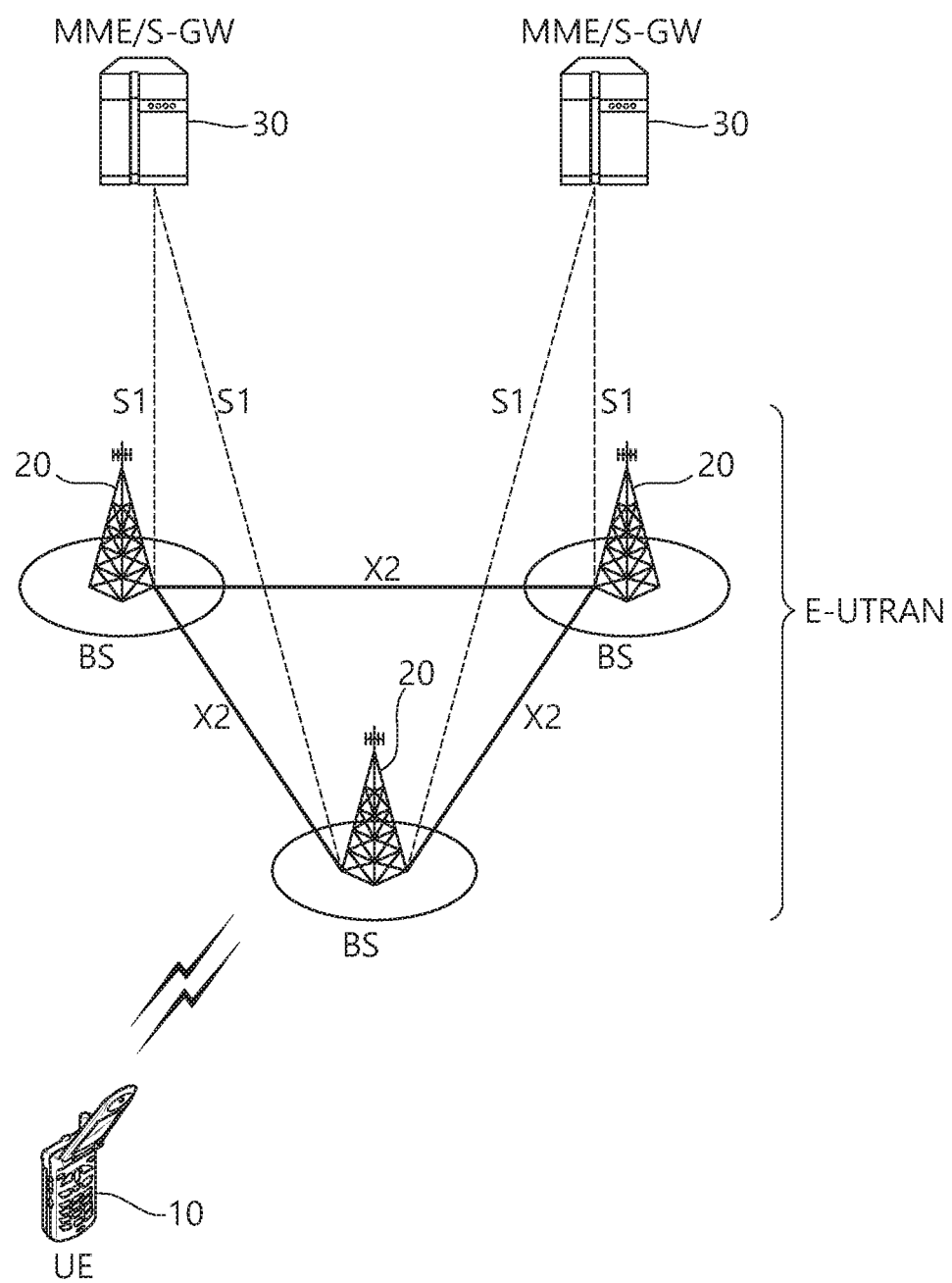
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
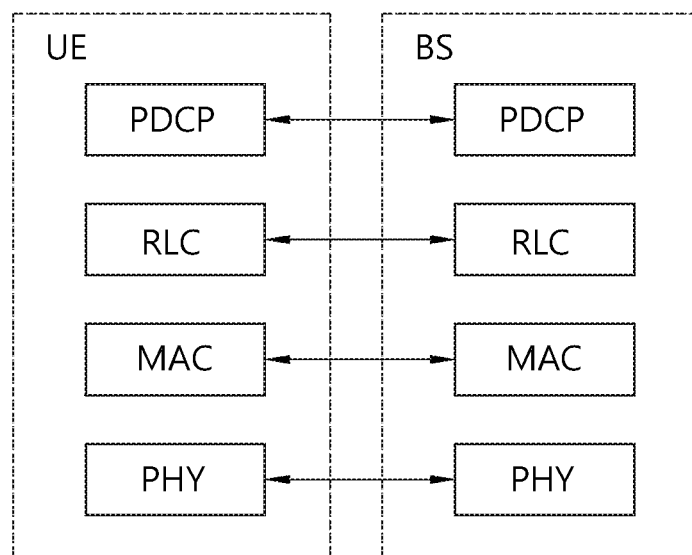
FIG. 2 is a diagram showing a wireless protocol architecture for a user plane.
Figure 3:
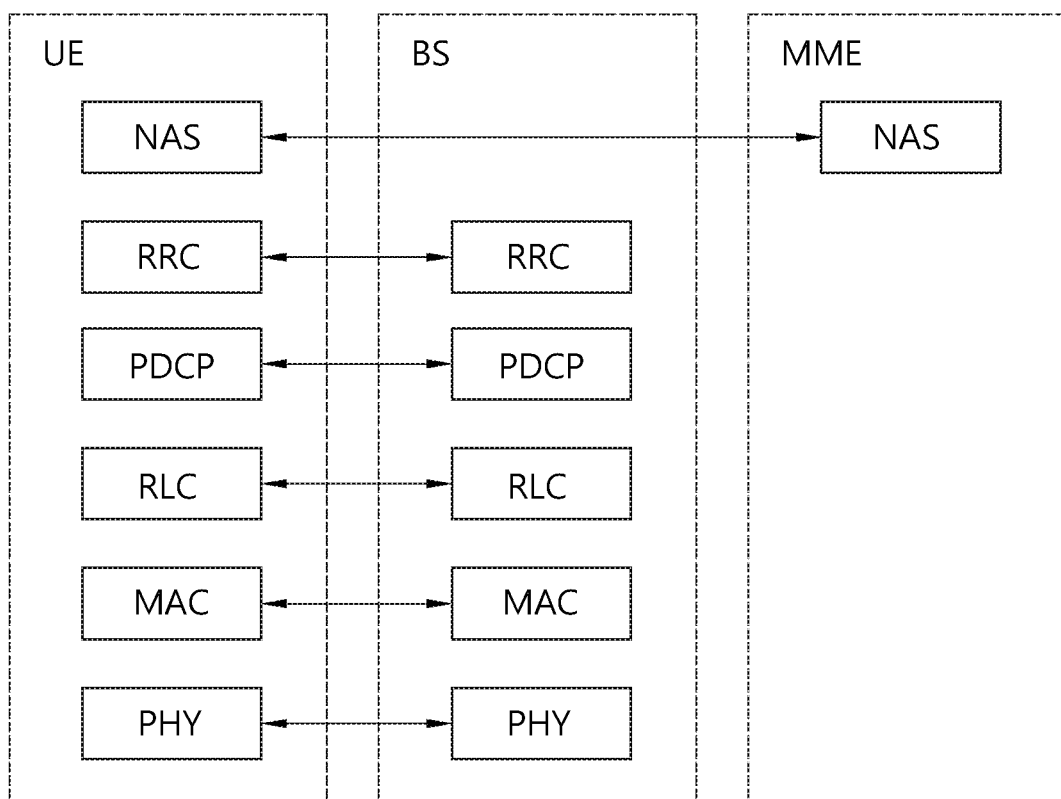
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes 51 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

Hereinafter, a D2D operation will be described. In 3GPP LTE-A, a service related to the D2D operation is referred to as a proximity-based service (ProSe). Hereinafter, a ProSe is conceptually equivalent to a D2D operation and may be interchangeable with a D2D operation. Sidelink communication may be referred to as different terms, such as D2D communication, ProSe direct communication, and ProSe communication. Sidelink discovery may be referred to as different terms, such as D2D discovery, ProSe direct discovery, and ProSe discovery. Hereinafter, ProSe is described. A D2D operation is performed between UEs, in which an interface between the UEs may be referred to as a sidelink. A sidelink is a UE-to-UE interface for sidelink communication and sidelink discovery and corresponds to a PC5 interface.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
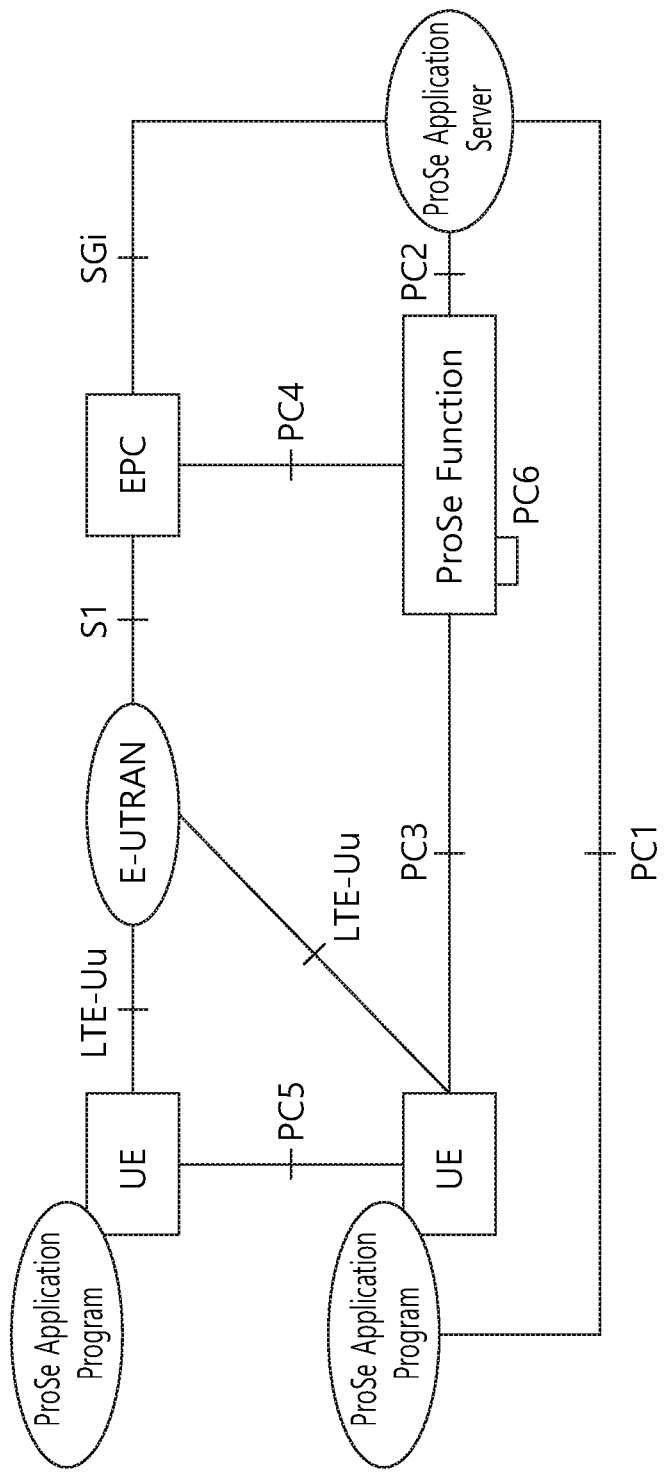
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 5:
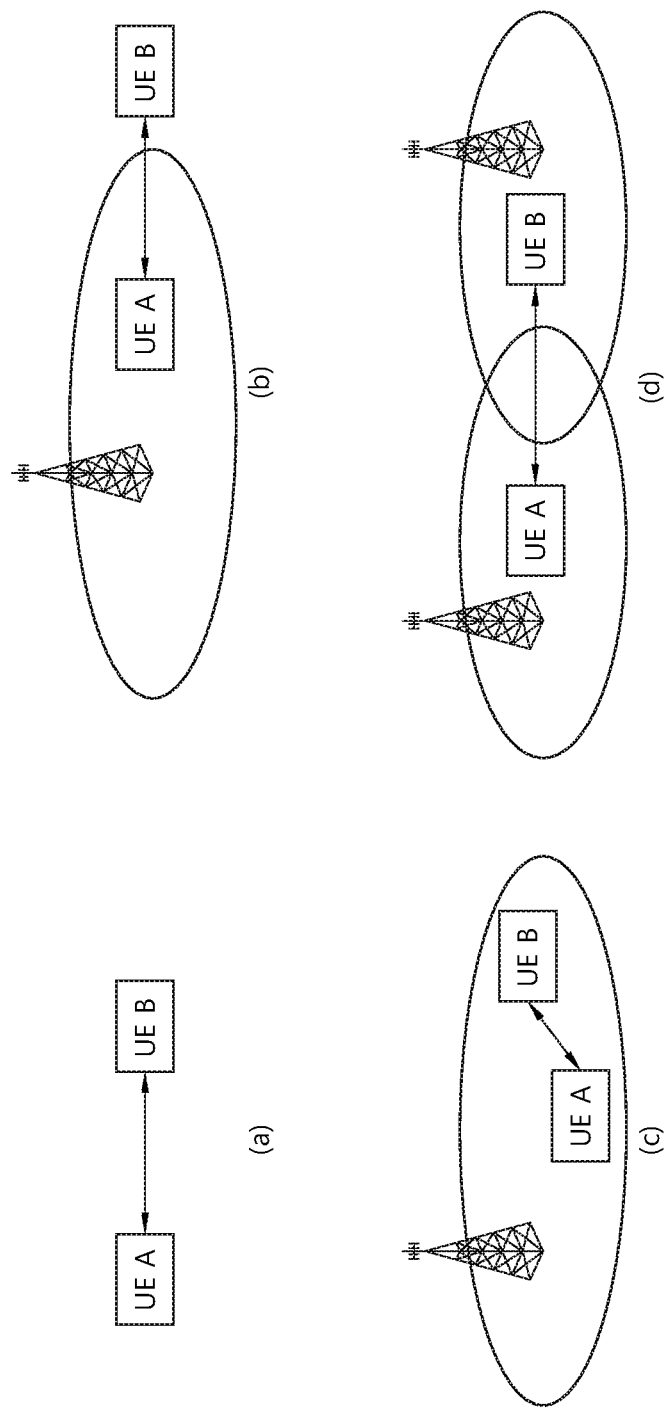
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Hereinafter, the present invention will be described.

The present invention proposes a method and a device for transmitting downlink control information (DCI) in a wireless communication system.

Hereinafter, a UE refers to a terminal of a user. However, when network equipment, such as a BS, transmits or receives a signal according to the communication mode between UEs, the network equipment may also be regarded as a UE.

For the convenience of description, abbreviations used in the present invention are described.

A PSBCH represents a physical sidelink broadcast channel. A PSCCH represents a physical sidelink control channel A PSDCH represents a physical sidelink discovery channel. A PSSCH represents a physical sidelink shared channel. An SLSS represents a sidelink synchronization signal. An SLSS includes a primary sidelink synchronization signal (PSSS) and a secondary sidelink synchronization signal (SSSS).

As described above, a sidelink refers to a UE-to-UE interface for D2D communication and D2D discovery. A sidelink corresponds to a PC5 interface. D2D communication may be referred to as sidelink communication or simply as communication, and D2D discovery may be referred to as sidelink discovery or simply as discovery. A D2D UE refers to a UE that performs a D2D operation, and a D2D operation includes at least one of D2D communication and D2D discovery.

Hereinafter, for the convenience of description, the present invention will be described based on 3GPP LTE/LTE-A systems. However, the present invention may also be applicable to systems other than the 3GPP LTE/LTE-A systems.

The present invention may also be applied to vehicle-to-everything (V2X) communication. V2X communication refers to a communication mode of exchanging or sharing information, such as traffic conditions, through communication with road infrastructure and other vehicles while driving. V2X may include vehicle-to-vehicle (V2V), which refers to communication between vehicles, vehicle-to-pedestrian (V2P), which refers to communication between UEs carried by a vehicle and an individual person, and vehicle-to-infrastructure/network (V2I/N), which refers to communication between a vehicle and a roadside unit (RSU) and a network. Hereinafter, V2V is illustrated as an example of V2X communication, but the present invention is not limited thereto.

UE operations related to V2V communication will be described. V2V communication refers to communication between a UE installed in a first vehicle and a UE installed in a second vehicle.

Figure 6:
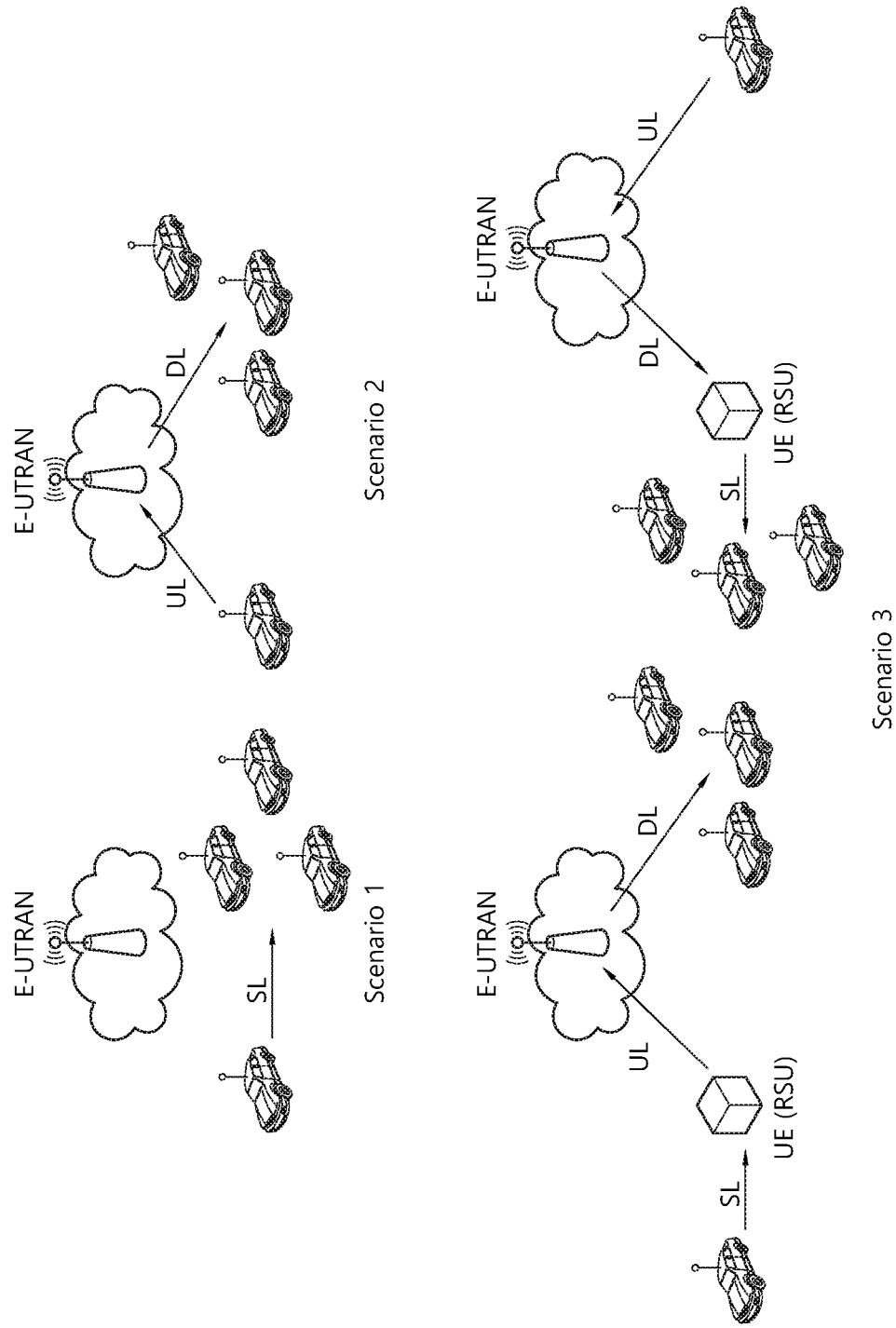
FIG. 6 illustrates scenarios in which V2V communication is performed.

FIG. 6 illustrates scenarios in which V2V communication is performed.

Referring to FIG. 6, V2V communication may be performed in: 1) scenario 1 where only a V2V operation based on PC5, which is an interface between UEs, is supported; 2) scenario 2 where only a V2V operation based on Uu, which is an interface between a BS (eNodeB) and a UE, is supported; and 3) scenario 3 where a V2V operation is supported using both PC5 and Uu.

Figure 7:
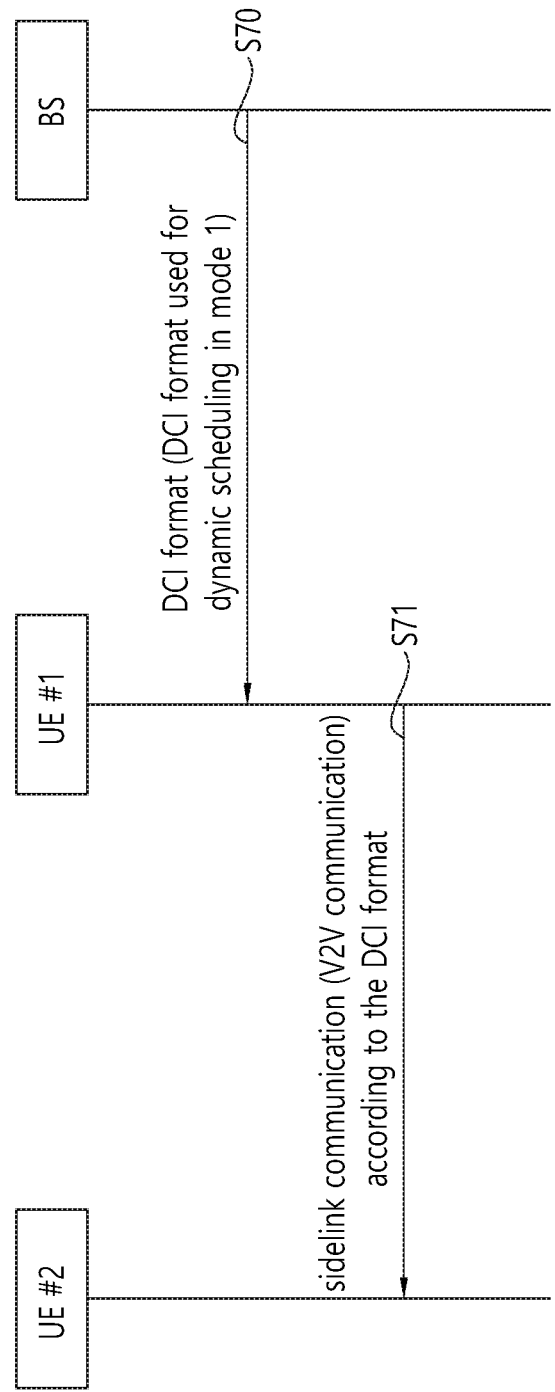
FIG. 7 illustrates a signaling process for V2V communication between UEs and a BS.

FIG. 7 illustrates a signaling process for V2V communication between UEs and a BS.

Referring to FIG. 7, a BS transmits a DCI format to UE #1 (S70). The DCI format may be a DCI format for mode 1, that is, a mode in which the BS schedules a resource for V2V communication. UE #1 may perform sidelink communication, for example, V2V communication, with UE #2 using the resource scheduled according to the DCI format (S71).

Figure 8:
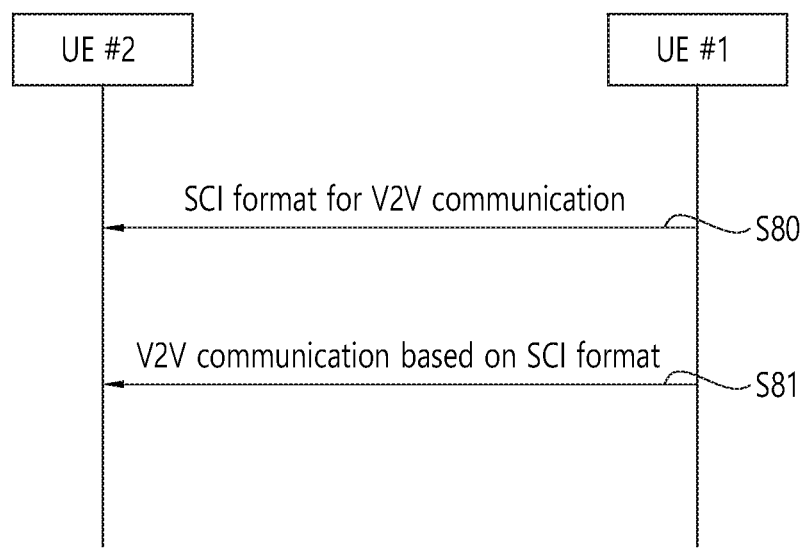
FIG. 8 illustrates a signaling process for V2V communication between UEs.

FIG. 8 illustrates a signaling process for V2V communication between UEs.

Referring to FIG. 8, UE #1 transmits a sidelink control information (SCI) format for V2V communication (S80). Subsequently, UE #1 may perform V2V communication with UE #2 on the basis of the SCI format (S81).

Regarding V2V communication, when a scheduling assignment (SA) and data associated with the SA are transmitted in the same subframe, a resource indicated by decoding the SA or reserved or a resource having a PSSCH RSRP of a threshold value or greater among resources for the associated data may be excluded.

Here, PSSCH RSRP in the resources for the associated data may be defined as the linear average of power distribution of resource elements carrying a DM RS associated with an associated PSSCH in PRBs indicated by the PSCCH.

A reference point for PSSCH RSRP may be an antenna connector of a UE.

For SA decoding, a UE may perform the following operations.

Resource selection/reselection may be triggered for the UE in a subframe (hereinafter, also referred to as a TTI) #n. Then, the UE may sense from subframe #n–a to subframe #n–b (a>b>0, where a and b are an integer) and may select/reselect a resource for transmission of a V2V message based on the sensing result.

Values a and b may be set commonly to UEs or may be set independently for UEs.

When a and b are common values to UEs, for example, 'a=1000+b'. That is, when the UE is triggered to autonomously select a resource for transmission of a V2V message, the UE may perform a sensing operation for one second (1000 ms=1000 subframes=1000 TTIs).

The UE may consider SAs of other UEs in an interval from subframe #n–a to subframe #n–b. The SA may be associated with data transmission in the interval from subframe #n–a to subframe #n–b and may be transmitted before subframe #n–a.

When the UE does not perform a sensing operation in subframe #m (for example, since a signal is transmitted in subframe #m), the UE may exclude subframes #(m+100*k) from resource selection/reselection. The UE may not perform but skip a sensing operation in subframes that are used for the UE to transmit a signal.

After performing sensing, the UE selects a time/frequency resource for a PSSCH, that is, a sidelink data channel Alternatively, upon decoding an SA in subframe (TTI) #m+c in a sensing period, a first UE may assume that the same frequency resource is also reserved in subframe #m+d+P*i by a second UE transmitting the SA. Here, P may be a fixed value of 100, and i may be selected from among [0, 1, . . . , 10] and may be carrier-specifically limited. Alternatively, i may be set to 0, which means that it is not intended to reserve a frequency resource. The value of i may be signaled via a 4-bit field in the SA.

When candidate semi-persistent resource X having a P*I period collides with resource Y reserved by an SA of another UE and satisfies a threshold condition, the UE may exclude resource X. I may be a value for i signaled via the SA.

When resources remaining after excluding resources via SA decoding and sensing are less than 20% of the total resources in a selected window, the UE may increase a threshold (e.g., 3 dB) and may then exclude a resource again, in which excluding resources may be performed until the remaining resources are greater than 20% of the total resources in the selected window.

The measurement period of the PSSCH resource may be P. The measurement may be performed only on resources remaining via the foregoing process.

In a process of selecting a V2V transmission resource after excluding a particular resource, when a counter reaches 0, the UE may maintain a current resource with a probability of p and may reset the counter. That is, a resource may be reselected with a probability of 1-p. A carrier-specific parameter p may be preset and may be set in a range of [0, 0.2, 0.4, 0.6, 0.8].

The UE measures the remaining PSSCH resources excluding the particular resource, ranks the resources on the basis of the total reception energy, and then selects a subset thereof. The subset may be a set of candidate resources having the lowest reception energy. The size of the subset may be 20% of the total resources in the selected window.

The UE may randomly select one resource from the subset.

When only one transmission block is transmitted in one subframe, the UE may select M consecutive subchannels, and the average of energy measured in each subchannel may be an energy measurement of each resource.

When a transmission block is transmitted in two subframes, the following resource selection methods may be supported. One resource may be selected using a mechanism defined for a case where a transmission block is transmitted in one subframe. Alternatively, when a particular condition is satisfied, it is possible to randomly select another resource.

The UE may not transmit a transmission block without an SA. That is, an SA also needs to be transmitted in TB transmission or retransmission.

When a resource is set such that an SA and data can be transmitted in the same subframe, the UE does not expect to combine the resource with a PSCCH transmitted in another subframe.

When a resource is set such that an SA and data are always transmitted via contiguous resource blocks in the same subframe, a subchannel having the lowest index among subchannels selected for data transmission is used for SA transmission. A resource pool may include one subchannel or a plurality of subchannels in the frequency domain. A subchannel may include consecutive resource blocks in the same subframe. The size of a subchannel, that is, the number of resource blocks included the subchannel, may be one of {5, 6, 10, 15, 20, 25, 50, 75, 100} and may be predetermined or may be set by a BS. Each subchannel may include one SA candidate resource. The SA candidate resource may also be used for data transmission.

When a resource is set such that an SA and data are transmitted via noncontiguous resource blocks in the same subframe, the number of subchannels in an associated data resource pool and the number of SA candidate resources in an SA resource pool may be the same. The SA candidate resources in the SA resource pool and the subchannels in the data resource pool may be associated 1:1. A PSSCH resource pool may include one subchannel or a plurality of subchannels in the frequency domain. A subchannel may include consecutive resource blocks in the same subframe and may be predetermined or may be set by the BS. The maximum number of subchannels in one subframe may be 20. The minimum size (the number of resource blocks) of a subchannel may be four. The PSCCH resource pool may include consecutive PRBs.

The energy sensing granularity of a PSSCH may be the size of a subchannel.

The UE may always select an integer number of contiguous subchannels for transmission.

The UE does not attempt to decode more than 100 resource blocks in one subframe and does not attempt to decode more than 10 PSCCHs.

The SA resource pool and the data resource pool may overlap.

The resource pool for V2V may be defined by a bitmap mapped to subframes other than a subframe for transmitting an SLSS. The length of the bitmap may be any one of 15, 20, and 100. The bitmap may indicate/define a subframe in which SA/data transmission/reception for V2V is allowed.

When resource reselection is triggered, the UE reselects resources for all transmissions corresponding to a transmission block. An SA schedules only transmission corresponding to one transmission block.

Hereinafter, (A) an SCI format configuration field(s) used in a mode-2 V2V scheduling (MODE2_SCH) operation and/or (B) a DCI format configuration field(s) used in a mode-1 dynamic V2V scheduling (MODE1_DYN) will be described. Here, mode 1 is a mode in which a BS schedules a resource for V2V communication, and mode 2 is a mode in which a UE selects a resource for V2V communication from a resource pool set by a network or predetermined.

SCI may be control information transmitted by a UE in a sidelink, may be 48 bits in total, and may include the following fields.

Priority: 3 bits, resource reservation: 4 bits, MCS: 5 bits, CRC: 16 bits, retransmission index: 1 bit, time gap between initial transmission and retransmission: 4 bits (Here, this field has one value of 0 to 15, in which 0 denotes no retransmission of a related transmission block), frequency resource location (FRA_INRETX) for initial transmission and retransmission: 8 bits, reserved bits: 7 bits. RV 0 and 2 are sequentially used for initial transmission and retransmission.

DCI transmitted by a BS for dynamic scheduling for a sidelink may include the following fields.

CIF: 3 bits (an interpretation of the CIF may be preset and may be different from that of a CIF for uplink and downlink), lowest (smallest) index of subchannel assigned for initial transmission (PSCCH_RA): 5 bits, SA content: i) time gap between initial transmission and retransmission (TGAP_INRETX: 4 bits), ii) frequency resource location for initial transmission and retransmission (FRA_INRETX: 8 bits). The length of the DCI may be the same as DCI format 0, and an RNTI other than a C-RNTI/SPS-RNTI may be used. A time location for initial transmission may be the first subframe included in a resource pool of a V2V carrier and may be a subframe 4 ms after a subframe in which the DCI is transmitted.

It is assumed that the maximum number of subchannels (referred to as SF_MAXNUMSCH), which can be included in a V2V resource pool, in one subframe is (always) 20, the payload size of a MODE1_DYN DCI format may be a total of 20 bits (e.g. "3 (=CIF)+5 (=PSCCH_RA)+4 (=TGAP_INRETX)+8 (=FRA_INRETX)=20").

When the payload size of the MODI1_DYN DCI format is matched to that of existing DCI format 0, the payload size of the MODI1_DYN DCI format (e.g., 20 bits) may become greater than that of DCI format 0 (e.g., 19 bits (1.4 MHz)) at a particular system bandwidth (e.g., 1.4 MHz). To solve this problem, (some) methods are proposed as follows.

For example, a V2V (PSSCH (/PSCCH)) resource pool may be configured by (information) signaling (A) the total number of subchannels included in the V2V resource pool in one subframe, and/or (B) the number of resource blocks included in a (single) subchannel (subchannel size), and/or (C) the starting location of a subchannel (RB) in the frequency domain, and/or (D) the location of a subframe where the V2V resource pool is set (e.g., a predefined length (e.g., a bitmap format of 16, 20, or 100)) and/or (E) the starting location of a subchannel (RB) (in the frequency domain) of a (E)PSCCH resource pool (this information may be valid (present) only when a PSCCH and a (linked) PSSCH are not located on contiguous resource blocks in the same subframe)).

The following (some) proposed methods may be extended to (determination of FRA_INRETX size in) an SCI format associated with the MODE2_SCH operation.

The following table illustrates the payload size of existing DCI format 0 in each system bandwidth.

TABLE 1

| DCI format 0 | | | | | | |
|---|---|---|---|---|---|---|
| Bandwidth | 1.4 MHz | 3 MHz | 5 MHz | 10 MHz | 15 MHz | 20 MHz |
| Hopping flag | 1 | 1 | 1 | 1 | 1 | 1 |
| N_ULHOP | 1 | 1 | 1 | 2 | 2 | 2 |
| Resource block assignment | 5 | 7 | 7 | 11 | 12 | 13 |
| MCS & RV | 5 | 5 | 5 | 5 | 5 | 5 |
| NDI | 1 | 1 | 1 | 1 | 1 | 1 |
| TPC for PUSCH | 2 | 2 | 2 | 2 | 2 | 2 |
| Cyclic shift for DMRS | 3 | 3 | 3 | 3 | 3 | 3 |
| CQI request | 1 | 1 | 1 | 1 | 1 | 1 |
| Total bits | 19 | 21 | 21 | 26 | 27 | 28 |

[Proposed method #1] For example, the size of FRA_INRETX (and/or PSCCH_RA) included in DCI format 5A can be changed depending on the total number of subchannels (TSUBNUM_SF) included in a V2V resource pool (in one subframe) set (signaled) in advance. Here, DCI format 5A is a DCI format used for PSCCH scheduling and may also include fields used for PSSCH scheduling.

Figure 9:
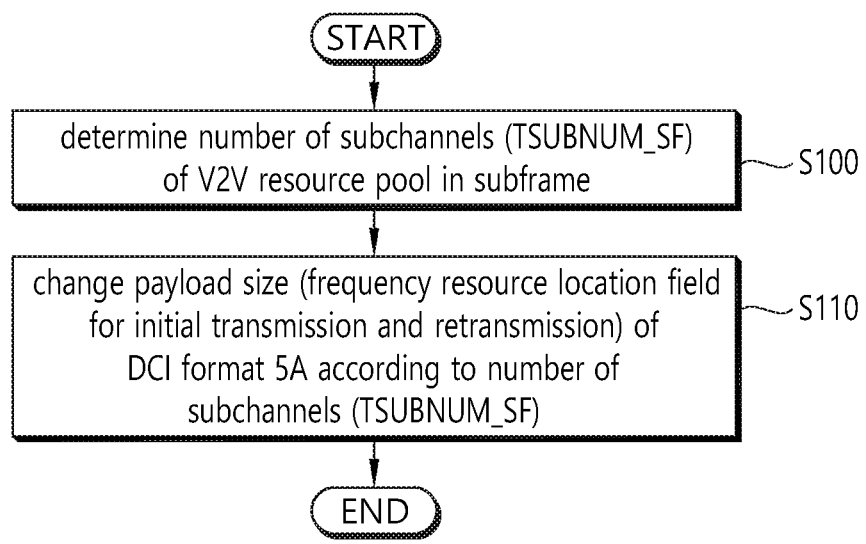
FIG. 9 illustrates a method for determining the payload size of DCI format 5A according to proposed method #1.

FIG. 9 illustrates a method for determining the payload size of DCI format 5A according to proposed method #1.

Referring to FIG. 9, a BS may determine the number of subchannels (=TSUBNUM_SF) of a V2V resource pool in a subframe (S100) and may change the payload size (frequency resource location field for initial transmission and retransmission) of DCI format 5A according to the number of subchannels (TSUBNUM_SF) (S110). Here, a subchannel may include a plurality of contiguous resource blocks in the same subframe. For example, the BS may adjust the number of resource blocks included in a subchannel, thereby adjusting the size of a resource allocation (RA) field of DCI format 5A. Accordingly, it is possible to prevent the total payload size of DCI format 5A from being greater than that of DCI format 0.

For example, when the total number of subchannels (TSUBNUM_SF) included in a V2V resource pool within one subframe is K, the size of FRA_INRETX (frequency resource location field for initial transmission and retransmission) (and/or PSCCH_RA (lowest (smallest) index field of a subchannel assigned for initial transmission)) included in DCI format 5A may be CEILING($LOG_2$(K·(K+1)/2)) (and/or "CEILING ($LOG_2$(K))"). Here, CEILING(X) is a function for deriving a minimum integer value that is equal to or greater than X.

For example, when the total number of subchannels (TSUBNUM_SF) included in a V2V resource pool within one subframe is 10, the size of FRA_INRETX (and/or PSCCH_RA) may be six bits (and/or four bits).

When this rule is applied, TSUBNUM_SF (number of subchannels) is properly set (signaled) (by a network), thereby solving the foregoing problem such that the payload size (e.g., 20 bits) of the MODE1_DYN DCI format is greater than the payload size (e.g. 19 bits) of existing DCI format 0 in a 1.4 MHz system bandwidth.

For example, the size of FRA_INRETX (and/or PSCCH_RA) can be changed according to the FLOOR value (the number of resource blocks included in a system bandwidth/(one) subchannel (subchannel size)) (which is referred to as MAX_SUBVAL). Here, FLOOR(X) is a function for deriving a maximum integer value that is less than or equal to X.

For example, when MAX_SUBVAL=K, the size of FRA_INRETX (and/or PSCCH_RA) may be changed to CEILING($LOG_2$(K·(K+1)/2)) (and/or CEILING ($LOG_2$(K))).

[Proposed method #2] For example, (when proposed method #1 is applied) remaining bits of "(payload size of (existing) DCI format 0−CEILING($LOG_2$(K(K+1)/2)) (=FRA_INRETX size)−3(=CIF)−5(=PSCCH_RA)−4 (=TGAP_INRETX))" and/or remaining bits of "(payload size of (existing) DCI format 0−CEILING($LOG_2$(K(K+1)/2)) (=FRA_INRETX size)−3(=CIF)−CEILING($LOG_2$(K)) (=PSCCH_RA size)−4(=TGAP_INRETX)" can be set to a value (e.g., 0 or 1) designated by a (serving) BS (or network) through predefined (higher/physical)-layer (e.g., SIB or RRC) signaling or may be (always) padded with zeros (by a UE). The remaining bits may be used as a virtual CRC.

The application of (some of) this rule may be interpreted such that additional extra bits, which occur when the FRA_INRETX size is changed according to proposed method #1 (in MODE1_DYN DCI format and/or MODE2_SCH SCI format), (e.g., "(8−CEILING($LOG_2$(K·(K+1)/2)) (=FRA_INRETX size))" and/or "(8−CEILING ($LOG_2$(K~(K+1)/2)) (=FRA_INRETX size)−CEILING ($LOG_2$(K))(=PSCCH_RA size))")) (and/or the (target) payload size predefined (signaled) (e.g., (additional) extra bits, which occur when the FRA_INRETX size is changed according to proposed method #1, the (target) payload size in MODE1_DYN DCI format and the (target) payload size in MODE2_SCH SCI format may be the payload size of (existing) DCI format 0, which is 48 bits) may be set to a value designated by a (serving) BS (or network) through predefined (higher/physical)-layer signaling or may be (always) padded with zeros (by a UE).

When proposed method #1 is applied, if an (mode-1) SPS operation-related field (e.g., SPS configuration (/activation (/release)) indicator) (SPS_PALD) needs to be further defined in a MODE1_DYN operation-related DCI format, a TSUBNUM_SF value may be (limitedly) set (/signaled) when a condition is satisfied that remaining bits of "(payload size of (existing) DCI format 0–CEILING(LOG$_2$(K·(K+1)/2))(=FRA_INRETX size)–3(=CIF)–5(=PSCCH_RA)–4 (=TGAP_INRETX)–SPS_PALD size)" (and/or remaining bits of "(payload size of (existing) DCI format 0–CEILING (LOG$_2$(K·(K+1)/2))(=FRA_INRETX size)–3(=CIF)–CEILING(LOG$_2$(K))(=PSCCH_RA size)–4(=TGAP_INRETX)–SPS_PALD size)" is greater than 0.

A MODE1_DYN operation-related DCI format (M1DYN_DCI) may be managed according to (some of) the following rules. Here, (some of) the rules may also be applied to a mode-1 V2V SPS operation-related DCI format.

[Proposed method #3] When cross-carrier scheduling (CCS) M1DYN_DCI for a particular frequency (cell) (referred to as SD_CELL) is transmitted on a search space (SS) of (another) particular frequency (cell) (referred to as SC_CELL) that is preset (/signaled), the payload size of CCS M1DYN_DCI can be matched to the (payload) size (SC_FMOLN) of a preset (/signaled) DCI format (e.g., DCI format 0) based on an SC_CELL-related parameter (not to the (payload) size (SD_FMOLN) of a preset (/signaled) DCI format (e.g., DCI format 0) based on an SD_CELL-related parameter (e.g., system (uplink) bandwidth)).

Here, the search space of the (other) particular frequency (cell) (SC_CELL), on which SD_CELL-related M1DYN_DCI is transmitted, may be construed as a search space that is located on (another) (preset/signaled) particular frequency (cell) for cross-carrier scheduling of SC_CELL and transmits cross-carrier scheduling information related to the (other) particular frequency (cell) (SC_CELL) SS.

For example, when the (payload) size of CCS M1DYN_DCI is smaller than SC_FMOLN, zero padding may be performed such that the (payload) size equals SC_FMOLN.

Figure 10:
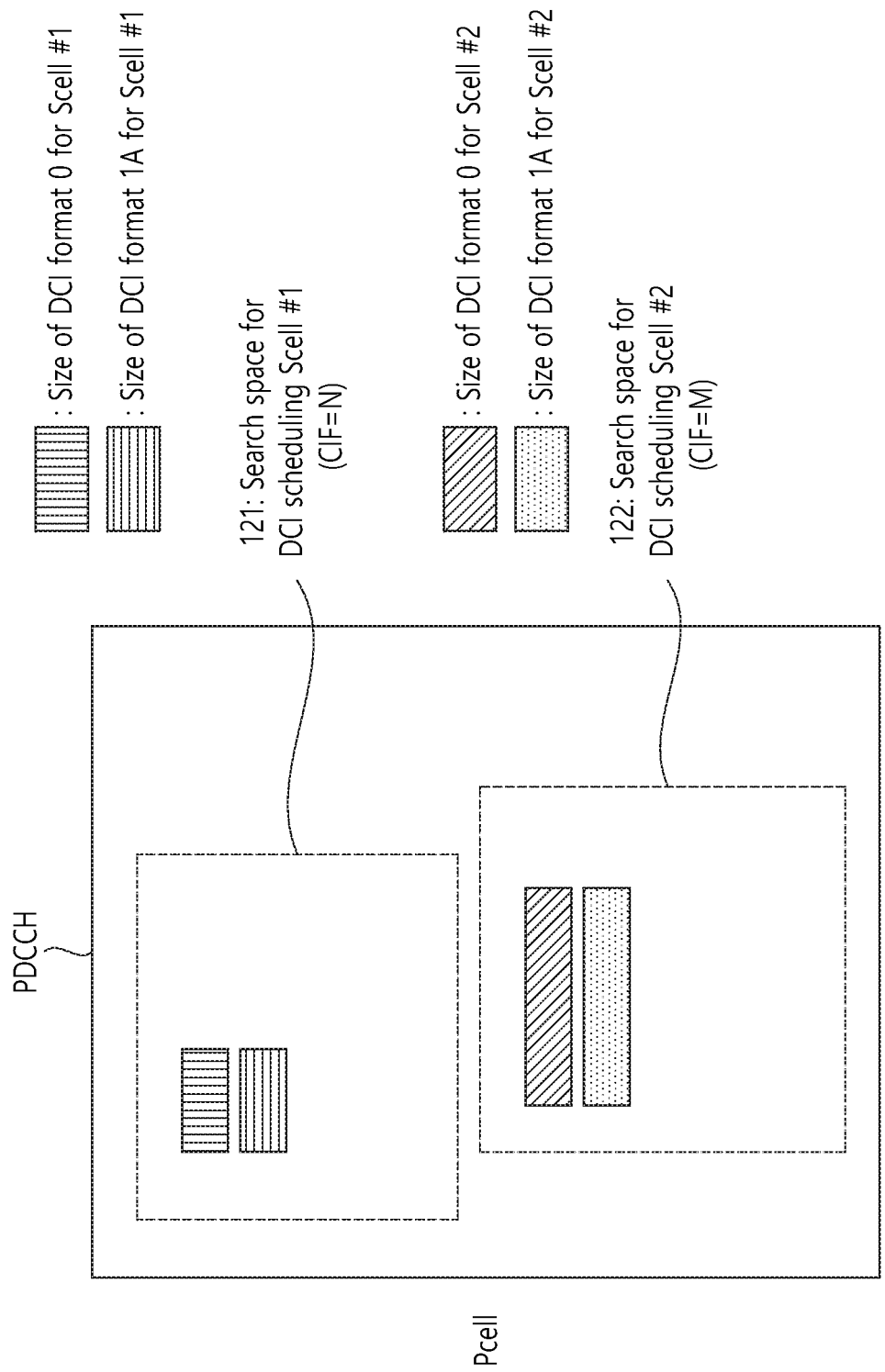
FIG. 10 illustrate a size fitting method for DCI format 1A according to the prior art.

FIG. 10 illustrate a size fitting method for DCI format 1A according to the prior art.

Referring to FIG. 10, a first search space 121 for DCI to schedule secondary cell #1 (Scell #1) and a second search space 122 for DCI to schedule secondary cell #2 (Scell #2) may be determined within a PDCCH region for a primary cell. A carrier indication field (CIF) for Seen #1 is N and a CIF for Scell #2 is M, where N and M may be different integers.

In this case, DCI format 1A for Scell #1 in the first search space 121 is size-fitted to the size of DCI format 0 for Scell #1. DCI format 1A for Scell #2 in the second search space 122 is size-fitted to the size of DCI format 0 for Scell #2. That is, when the number of information bits of DCI format 1A mapped to a given search space is less than that of DCI format 0 that is mapped to the search space and schedules the same serving cell, zero padding is performed so that DCA format 1A has the same size as that of DCI format 0.

Figure 11:
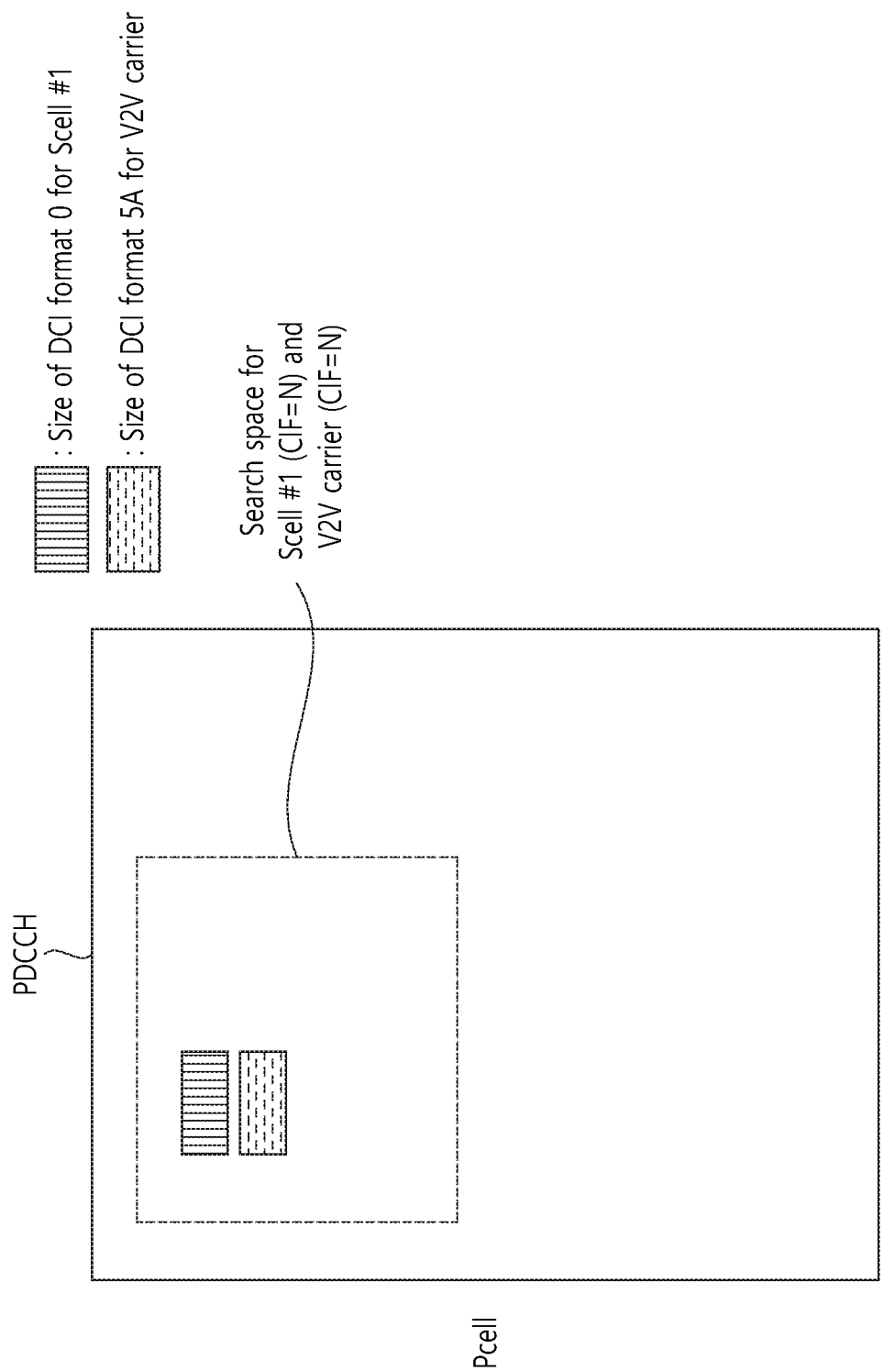
FIG. 11 conceptually illustrates a size fitting method for DCI format 5A according to proposed method #3.

FIG. 11 conceptually illustrates a size fitting method for DCI format 5A according to proposed method #3.

Referring to FIG. 11, DCI format 0 for Scell #1 and DCI format 5A for a V2V carrier may share the same search space. For example, when a CIF for Scell #1 and a CIF for the V2V carrier are set to have the same value (=N), the search spaces may be set to be common.

In this case, DCI format 5A for the V2V carrier undergoes zero padding (i.e. size fitting) to match the size of DCI format 0 that shares the same search space regardless of whether the formats(the DCI format 5A and the DCI format 0) are for the same serving cell. That is, even though the same search space is shared with DCI format 0 for a different cell, the size of DCI format 5A for the V2V carrier is matched to the size of DCI format 0 for the different cell.

Figure 12:
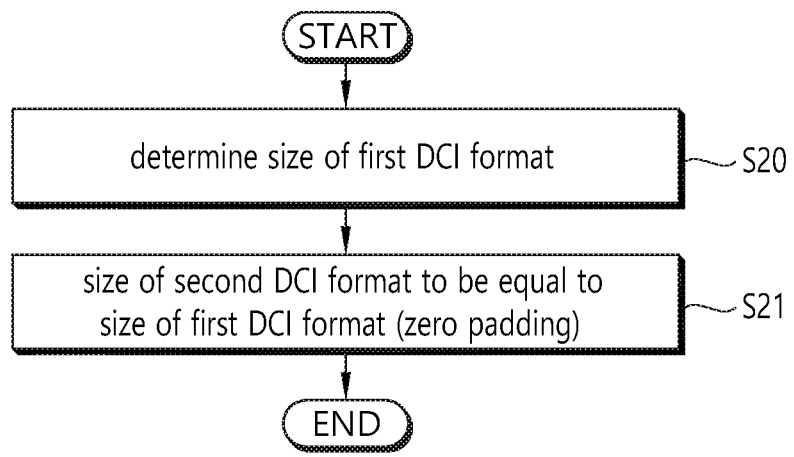
FIG. 12 illustrates a generalized size fitting method for a DCI format according to proposed method #3.

FIG. 12 illustrates a generalized size fitting method for a DCI format according to proposed method #3.

Referring to FIG. 12, a BS may determine the size of a first DCI format (S20), may fit the size of a second DCI format (zero padding) to the size of the first DCI format (S21), and may transmit the second DCI format to a UE. The first DCI format and the second DCI format may be DCI formats that share the same search space regardless of whether the formats are for the same serving cell. That is, the first DCI format and the second DCI format may be DCI formats for scheduling physical channels of different serving cells.

The first DCI format and the second DCI format may have the same (IF value and may thus share the same search space. That is, the first DCI format and the second DCI format may be mapped to the same search space.

Figure 13:
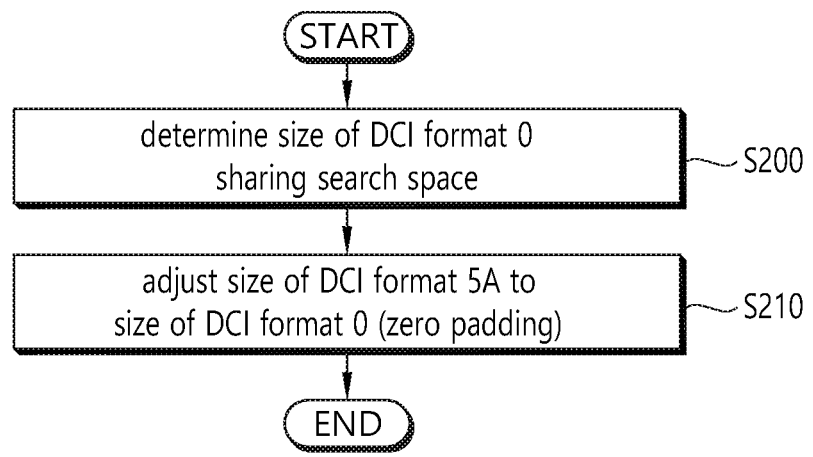
FIG. 13 illustrates a specific example of applying FIG. 12.

FIG. 13 illustrates a specific example of applying FIG. 12.

Referring to FIG. 13, a BS may determine the size of DCI format 0 (S200), may fit the size of DCI format 5A (zero padding) to the size of DCI format 0 (S210), and may transmit DCI format 5A to a UE. As described above, DCI format 0 is a DCI format used to schedule a physical uplink shared channel (PUSCH), and DCI format SA is a DCI format used to schedule a physical sidelink control channel (PSCCH) and may also include fields for PSSCH scheduling.

Meanwhile, when the foregoing rule is applied, the UE may (always) assume (/expect) that the (payload) size of CCS M1DYN_DCI before zero padding on the SC_CELL SS is not greater than SC_FMOLN (e.g., DCI format 0). Further/alternatively, it may be interpreted that a network (always) configures (/signals) (or guarantees (by adjusting the number of subchannels included in a V2X resource pool)) the (payload) size of CCS M1DYN_DCI before zero padding on the SC_CELL SS not to be greater than SC_FMOLN.

In determining and retrieving for DCI formats to be retrieved in a search space, the UE may retrieve DCI format 5A assuming that the size of DCI format 5A is equal to the size of DCI format 0 sharing the search space with DCI format 5A.

Figure 14:
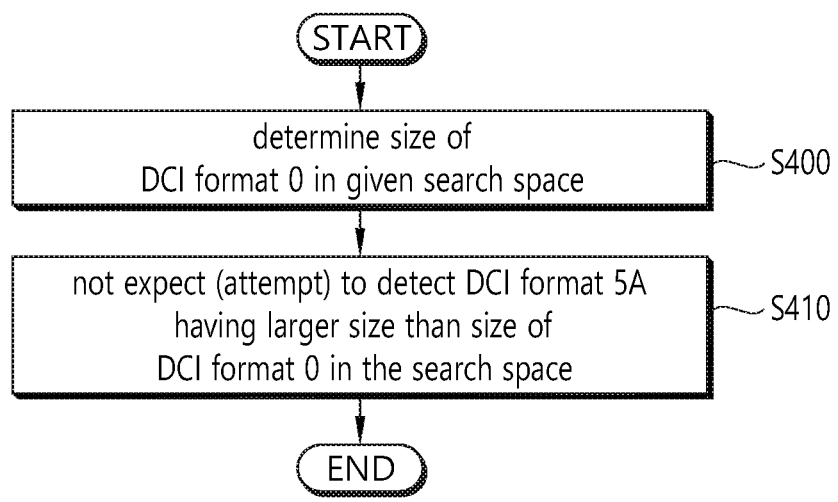
FIG. 14 illustrates an operation method of a UE in a search space.

FIG. 14 illustrates an operation method of a UE in a search space.

Referring to FIG. 14, the UE may determine the size of DCI format 0 in a given search space (S400) and may not expect (attempt) to detect DCI format 5A having a size larger than the size of DCI format 0 in the search space (S410).

CCS M1DYN_DCI(s) related to a plurality of preset (/signaled) SD_CELL(s) transmitted on an SC_CELL search space may be considered to be transmitted, regardless of the value of each CIF, in a SC_CELL-related UE-specific search space (USS) (and/or common search space (CSS)) (or transmitted in an (individual) SD_CELL-related USS (and/or CSS) (on SC_CELL) derived by a search space equation having a CIF value as an input parameter (e.g., when the SD_CELL-related CCS M1DYN_DCI is transmitted on the SC_CELL SS, it may be considered that SD_CELL and SC_CELL have the same CIF value)).

For example, a CIF (e.g., 3 bits) of particular frequency (cell)-related M1DYN_DCI may be defined to be always included regardless of whether a CCS operations is configured (/applied).

Here, when this rule is applied, the payload size of M1DYN_DCI transmitted in a frequency (/cell) (SF_CELL) to which a self-scheduling (SFS) MODE1_DYN operation is applied may be matched to the (payload) size of a DCI format (e.g., DCI FORMAT 0) preset (/signaled) based on an SF_CELL-related parameter (e.g., system (uplink) bandwidth) in the absence of a CIF (or in the case where a CCS operation is not configured).

((Preset (/signaled)) (a plurality of) SD_CELL(s)-related) CCS M1DYN_DCI(s) may be transmitted only in a particular preset (/signaled) frequency (/cell) (e.g., primary frequency (/cell) or secondary frequency (/cell)) (USS (and/or CSS)) and/or a particular preset (/signaled) frequency (/cell)-related CIF value may be (always) set to 0 (or a particular preset (/signaled) value).

For example, a linkage between a CIF value for a frequency (/cell) in which V2X communication (/operation) is performed and a CIF value for a frequency (/cell) in which WAN (UL) communication (/operation) is performed may be set through predefined higher (/physical)-layer signaling.

When this rule is applied, V2X DCI related to the frequency (/cell) where V2X communication (/operation) is performed, which is related to the set linkage, may be (blind-) detected in a search space related to the frequency (/cell) where WAN (UL) communication (/operation) is performed. Further/alternatively, it may be interpreted that WAN (UL) DCI related to the frequency (/cell) where WAN (UL) communication (/operation) is performed, which is related to the set linkage, may be blind-detected in an SS related to the frequency (/cell) where V2V communication (/operation) is performed.

Hereinafter, structures and (payload) sizes for mode-1 sidelink dynamic scheduling DCI (MODE1_SLDYNDCI) and/or mode-1 sidelink semi-persistent scheduling DCI (MODE1_SLSPSDCI) and/or mode-1 uplink semi-persistent scheduling DCI (MODE1_ULSPSDCI) will be described.

A DCIs-related size-fitting operation may be performed according to (some of) the following rules. Here, (some of) the following rules may be limitedly applied only when a mode-1 sidelink dynamic scheduling (MODE1_SLDYN) operation and/or a mode-1 sidelink semi-persistent scheduling (MODE1_SLSPS) operation are simultaneously set (/signaled) for one V2X UE with respect to one particular carrier/frequency.

Hereinafter, for the convenience of description, a carrier (/frequency) where a MODE1_SLDYN operation and/or a MODE1_SLSPS operation are performed is referred to as "V2X_CARRIER", and a carrier (/frequency) where related cross-carrier scheduling (CCS) DCI is transmitted is referred to as "SCH_CARRIER". "SCH_CARRIER" may also be referred to as, for example, "WAN (UL) carrier (/frequency)" (e.g., primary cell (/secondary cell)).

V2X_CARRIER and SCH_CARRIER may be different carriers in cross-carrier scheduling or may be the same carrier in self-scheduling (SFS).

In the present invention, the term "carrier" may be (extended to) interpreted as "cell" and/or "component carrier".

The mode-1 sidelink dynamic scheduling DCI (MODE1_SLDYNDCI) may include the following fields:

1) CIF which occupies 3 bits; 2) lowest index of assigned subchannel, which may be obtained by Ceil(log$_2$(k)) and may occupy one of 0 to 5 bits; 3) time gap between initial transmission and retransmission which occupies 4 bits; and 4) frequency resources for initial transmission and last transmission, which may be obtained by Ceil(log$_2$(k*(k+1)/2) and may occupy one of 0 to 8 bits.

When the number of information bits in a V2V DCI format mapped to a given search space is less than the payload size of DCI format 0 that is mapped to the same search space, zeros are appended to the V2V DCI format until the V2V DCI format has the same size as that of DCI format 0 (including padding bits if present).

The mode-1 sidelink semi-persistent scheduling DCI (MODE1_SLSPSDCI) may include the following fields.

MODE1_SLSPSDCI may further include the following two fields in addition to fields included in existing dynamic scheduling DCI (e.g., DCI 5A): 1) sidelink SPS configuration index which occupies 3 bits; and 2) activation/release indication which occupies 1 bit. The activation/release indication may indicate activation/release of a sidelink SPS. A RNTI (SL SPS RNTI) different from a sidelink dynamic scheduling RNTI may be defined.

MODE1_SLSPSDCI may include one SPS configuration index.

When the number of information bits in a sidelink semi-persistent scheduling DCI format mapped to a given search space is less than the payload size of DCI format 0 that is mapped to the same search space, zeros are appended to the sidelink semi-persistent scheduling DCI until the sidelink semi-persistent scheduling DCI has the same size as that of DCI format 0 (including padding bits if present).

The mode-1 uplink semi-persistent scheduling DCI (MODE1_ULSPSDCI) may reuse a particular field included in DCI format 0, for example, a cyclic shift DM RS (3 bits) field or a TPC command (2 bits) field, to indicate a V2X UL SPS configuration index.

The mode-1 uplink semi-persistent scheduling DCI may include one SPS configuration index.

[Proposed method #4] In one example, when at least one of MODE1_SLDYNDCI and MODE1_SLSPSDCI is transmitted via a search space in SCH_CARRIER where WAN (UL) communication (carrier (/frequency))-related DCI FORMAT 0 is transmitted (or, conversely, WAN (UL) communication (carrier (/frequency))-related DCI FORMAT 0 is transmitted (/present) in a search space in SCH_CARRIER in which at least one of MODE1_SLDYNDCI and MODE1_SLSPSDCI is transmitted), at least one of the following illustrative methods may be employed.

(Example #4-1) All or only (particular) predefined or signaled DCI (e.g., MODE1_SLDYNDCI)) among MODE1_SLDYNDCI, MODE1_SLSPSDCI, and DCI FORMAT 0 may be size-fitte to the largest payload size (e.g., the size of MODE1_SLSPSDCI or DCI FORMAT 0) among the payload sizes of the above three pieces of DCI.

(Example #4-2) The payload size of (only) MODE1_SLDYNDCI may be size-fitted to that of MODE1_SLSPSDCI. For example, when the payload size of DCI FORMAT 0 is smaller than that of MODE1_SLSPSDCI (and/or MODE1_SLDYNDCI), the payload size of (only) MODE1_SLDYNDCI may be size-fitted to that of MODE1_SLSPSDCI.

(Example #4-3) the payload size of all of MODE1_SLDYNDCI and/or MODE1_SLSPSDCI and/or DCI FORMAT 0 may be size-fitted to the payload size of particular preset (/signaled) DCI format (e.g., MODE1_SLSPSDCI or DCI FORMAT 0).

The search space in the scheduling carrier (SCH_CARRIER) in which the sidelink dynamic scheduling DCI (MODE1_SLDYNDCI) and/or the sidelink semi-persistent scheduling DCI (MODE1_SLSPSDCI) are transmitted is derived using a V2X_CARRIER-related CIF value. DCI FORMAT 0 may be construed as a particular preset (/signaled) reference DCI format for size fitting related to MODE1_SLDYNDCI and/or MODE1_SLSPSDCI transmitted on the same search space.

In another example, when MODE1_SLDYNDCI and/or MODE1_SLSPSDCI are transmitted via a search space in SCH_CARRIER where a reference DCI format (e.g., DCI format 0) is not transmitted (or, conversely, a reference DCI format is not transmitted (/present) in a search space in SCH_CARRIER where MODE1_SLDYNDCI and/or MODE1_SLSPSDCI are transmitted), at least one of the following illustrative methods may be employed.

(Example #4-4) The payload size of MODE1_SLDYNDCI may be size-fitted to a relatively large size of MODE1_SLSPSDCI. For example, the payload size of MODE1_SLSPSDCI may be greater by four bits than that of MODE1_SLDYNDCI.

Figure 15:
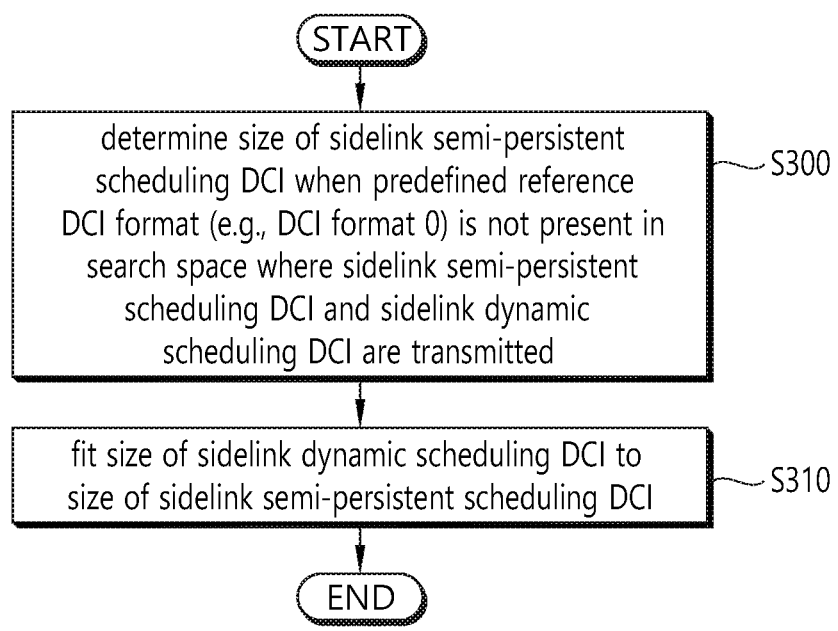
FIG. 15 illustrate a DCI size fitting method according to example #4-4.

FIG. 15 illustrate a DCI size fitting method according to example #4-4.

Referring to FIG. 15, when a predefined reference DCI format (e.g., DCI format 0) is not present in a search space where sidelink semi-persistent scheduling DCI and sidelink dynamic scheduling DCI are transmitted, a BS may determine the size of the sidelink semi-persistent scheduling DCI (S300) and may fit the size of the sidelink dynamic scheduling DCI to the size of the sidelink semi-persistent scheduling DCI (S310).

That is, when the sidelink semi-persistent scheduling DCI and the sidelink dynamic scheduling DCI are transmitted in a search space on a scheduling carrier where DCI format 0 is not transmitted, the size of the sidelink dynamic scheduling DCI is fitted to the size of the sidelink semi-persistent scheduling DCI. According to this method, it is possible to reduce the number of times a UE performs blind decoding and to reduce complexity.

(Example #4-5) Considering V2X_CARRIER as a virtual WAN (UL) communication carrier (/frequency), the payload size (VIR_DCIZSIZE) of DCI format 0 (or MODE1_SLSPSDCI) is derived on the basis of at least one of the payload size of DCI format 0 based on a V2X_CARRIER (system) bandwidth, the payload size of DCI format 0 based on a SCH_CARRIER (system) bandwidth (where WAN (UL(/DL)) communication is performed), the preset (/allowed) greatest (system) bandwidth (e.g., 20 MHz), and a nominal system bandwidth, the maximum number of subchannels (e.g., 20, or nominal subchannel number). Subsequently, the payload size of (all of) MODE1_SLDYNDCI and/or MODE1_SLSPSDCI (A) may be size-fitted to VIR_DCIZSIZE and/or (B) may be size-fitted to the largest payload size among the sizes of MODE1_SLDYNDCI and/or the size of MODE1_SLSPSDCI and/or VIR_DCIZSIZE.

(Example #4-6) The payload size of (all of) MODE1_SLDYNDCI and/or MODE1_SLSPSDCI may be size-fitted to the payload size of a particular preset (/signaled) DCI format.

Here, for example, duplex mode (e.g., TDD/FDD) information assumed (/applied) in calculating a reference DCI (payload) size (e.g., VIR_DCIZSIZE) for size fitting (of MODE1_SLDYNDCI and/or MODE1_SLSPSDCI) may be assumed (/considered) (A) to be the same as that of a system bandwidth (value) reference carrier (or V2X_CARRIER or SCH_CARRIER) and/or (B) to be a preset (/signaled) nominal duplex mode. For example, (since the payload size of DCI format 0 is smaller than that of MODE1_SLDYNDCI and/or MODE1_SLSPSDCI (and/or VIR_DCIZSIZE)), when the payload size of DCI format 0 should be increased (for size fitting), the payload size of DCI format 1A (transmitted in the same SS) may be size-fit to the increased payload size of DCI format 0.

In still another example, an additional field indicating information on the time location of a scheduled V2X subframe may be defined in MODE1_SLDYNDCI and/or MODE1_SLSPSDCI so that all subframes in a preset (/signaled) V2X resource pool on V2X_CARRIER are (cross-carrier-) scheduled (from a (TDD) UU carrier). This field may be, for example, 2 bits and may be referred to as TL_FIELD. A UU carrier refers to a carrier used between a BS and a UE.

The size of TL_FIELD may be fixed to a preset (/signaled) value (K_SIZE) (regardless of the TDD UL-DL configuration of the (TDD) UU carrier). Here, the size of actually used bits in K_SIZE may be differently (or independently) set (/signaled) for each TDD UL-DL configuration of a (TDD) UU carrier.

For example, bits actually not used in K_SIZE may be designated to be a preset (/signaled) value (e.g., 0) or may be used as a virtual CRC). Further/alternatively, bits actually not used in K_SIZE may be designated by a V2X UE to be a random value in order to obtain additional randomization effect of a PSSCH DM-RS sequence (/cyclic shift) (derived with a PSCCH CRC value).

When (cross-carrier scheduling) MODE1_SLDYNDCI and/or MODE1_SLSPSDCI including TL_FIELD are received in subframe #4 (SF #N) (on the (TDD) UU carrier), in which TL_FIELD indicates K, scheduling information-based initial transmission time may be the closest (K+1)th V2X subframe belonging to the (preset (/signaled)) V2X resource pool after 4 ms (four subframes) from the reception time (SF #N) of (cross-carrier scheduling) MODE1_SLDYNDCI and/or MODE1_SLSPSDCI.

In the above rule, the TL_FIELD size (and/or actually used bits in K_SIZE) may be differently set (/signaled) depending on the TDD UL-DL configuration of a (TDD) UU carrier (and/or (V2X transmission-related) scheduling type (e.g., self-carrier scheduling and cross-carrier scheduling)).

The foregoing rules may be extended to V2X UL SPS DCI in order to increase the degree of freedom in designating (/scheduling) V2X UL SPS activation (/release) time.

For example, when (cross-carrier scheduling) V2X UL activation (/release) SPS DCI including TL_FIELD is received in SF #N (on the (TDD) UU carrier), in which TL_FIELD indicates K, V2X UL activation (/release) application time may be the closest (K+1)th UL subframe after 4 ms (four subframes) from the reception time (SF #N) of the (cross-carrier scheduling) V2X UL activation (/release) SPS DCI.

Figure 16:
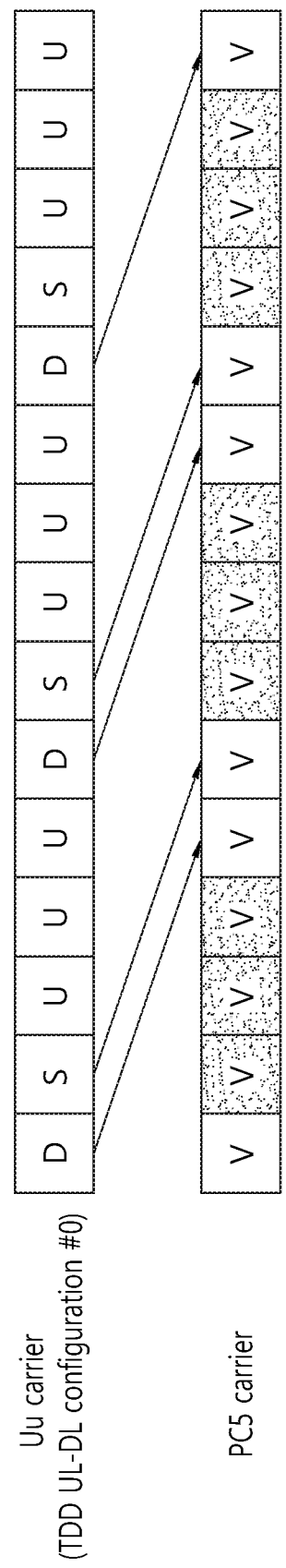
FIG. 16 illustrates sidelink cross-carrier scheduling timing.

FIG. 16 illustrates sidelink cross-carrier scheduling timing.

Referring to FIG. 16, a Uu carrier is set to TDD UL-DL configuration #0.

As illustrated in FIG. 16, when DCI is received in subframe #n (downlink subframe or special subframe) of the Uu carrier and subframe #n+4 of a PC5 carrier is scheduled by the DCI, it is impossible to schedule all subframes of the PC5 carrier. Therefore, in TDD, a field to indicate the time location of a V2V subframe scheduled may be added.

Hereinafter, examples of (A) the field configuration of a mode-1 sidelink dynamic scheduling DCI format (SL-DYN_DCI) (e.g., DCI format 5A) and/or (B) the field configuration of a mode-1 sidelink SPS DCI format (SL- SPS_DCI) and/or (C) the field configuration of an SCI format (SCI_FMT) (e.g., SCI format 1) will be described.

When a mode-1 sidelink SPS operation is performed, a UE may be allowed to set the value of a resource reservation field (which may be a field indicating a resource reservation period value or a V2X message transmission period value for a V2X transmission UE) of an SCI format according to (some of) the following rules.

First, DCI format 5A (SLDYN_DCI) is used for PSCCH scheduling may include the following information or fields:

1) carrier indication field (3 bits); 2) lowest index of subchannel allocation (which may occupy ceil($\log_2(N^{SL}_{subchannel})$) bits); 3) SCI format 1 fields; 4) sidelink index (2 bits, which may be present only for cases with TDD operation with UL-DL configuration 0-6).

The SCI format 1 fields may include: 1) a field of frequency resource location for initial transmission and retransmission; and 2) a field of time gap between initial transmission and retransmission.

When the number of information bits in DCI format 5A mapped to a given search space is less than the payload size of DCI format 0 that is mapped to the same search space, zeros are appended to DCI format 5A until DCI format 5A has the same size as that of DCI format 0 (including padding bits if present).

The sidelink SPS DCI (SLSPS_DCI) may further include fields of: 1) sidelink SPS configuration index (3 bits); and 2) activation/release indication (1 bit) in addition to the fields included in the dynamic scheduling DCI (i.e., DCI format 5A).

SCI format 1 (SCI_FMT) is used for PSSCH scheduling and may include the following information bits or fields:

1) priority (3 bits); 2) resource reservation (4 bits); 3) frequency resource location for initial transmission and retransmission (which may occupy ceil($\log_2(N^{SL}_{subchannel}(N^{SL}_{subchannel}+1)/2)$) bits); 4) time gap between initial transmission and retransmission (4 bits); 5) modulation and coding scheme (5 bits); and 6) retransmission index (1 bit). Meanwhile, reserved information bits are added until the size of SCI format 1 is equal to 32 bits.

[Proposed method #5] When a BS performs (particular) sidelink SPS configuration (index) (SLSPSCON #X) activation and/or (SLSPSCON #X-related) (periodic) resource reservation for V2X transmission UE #K through SLSPS_DCI, if transmitting a V2X message using some or all of (SLSPSCON #X-related) (periodic) resources, V2X transmission UE #K may be allowed to set the value of a resource reservation field in SCI_FMT (A) to an SLSPSCON #X-related period value ((RRC-) signaled in advance from the BS) and/or (B) to a value (preset (/signaled) or configured by the UE), instead of a (carrier-specific candidate) value configurable as a resource reservation field value, thus notifying another V2X UE that the UE transmits a V2X message based on mode 1 (and/or mode 1 sidelink SPS), and/or (C) to a (random) value configured by the UE. Here, the rules (B) and/or (C) may be (limitedly) applied only when a resource pool related to mode 1 (and/or mode 1 sidelink SPS) is set (/signaled) to be different from that for another mode (e.g., mode 2).

The illustrative proposed methods described above may also be included as methods for implementing the present invention and thus may be regarded as a kind of proposed schemes. In addition, the proposed methods described above may be implemented independently, but some of the proposed methods may be combined (or merged) for implementation.

Although the present invention has been described with reference to the proposed methods based on 3GPP LTE/LTE-A systems for the convenience of description, the scope of systems to which the proposed methods are applied may be extended to other systems besides the 3GPP LTE/LTE-A systems.

The proposed methods of the present invention may also be extended for D2D communication. Here, D2D communication refers to communication between one UE and another UE via a direct wireless channel A UE may be a terminal of a user. Further, when network equipment, such as a BS, transmits or receives a signal according to the communication mode between UEs, the network equipment may also be regarded as a UE.

The proposed methods of the present invention may be applied only to a mode-2 V2X operation (and/or mode-1 (sidelink dynamic scheduling and/or sidelink SPS and/or uplink SPS) V2X operation).

The proposed methods of the present invention may be limitedly applied only when a PSCCH and a (linked) PSSCH are not located (or are located) in contiguous resource blocks in the same subframe.

In addition, the proposed methods of the present invention may also be applied not only to a V2V mode-1 (/mode-2) dynamic scheduling operation but also to a V2V mode-1 (/mode-2) semi-static scheduling (SPS) operation (and/or a V2X mode-1 (/mode-2) dynamic scheduling operation and/or a V2X mode-1 (/mode-2) SPS operation).

In the present invention, the term "mode 1" (or "mode 2") may be interpreted as (/replaced with) "mode 3" (or "mode 4") related to V2X communication.

(All or some of) The proposed methods of the present invention may be applied to DCI and/or SCI associated with V2X communication.

Figure 17:
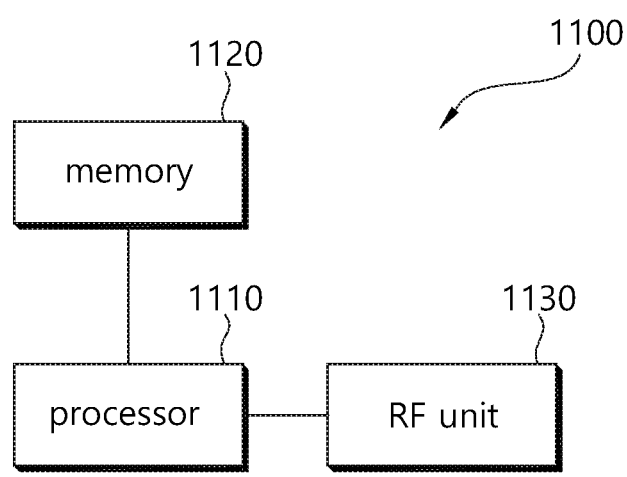
FIG. 17 is a block diagram illustrating a device to implement an embodiment of the present invention.

FIG. 17 is a block diagram illustrating a device to implement an embodiment of the present invention.

Referring to FIG. 17, the device 1100 includes a processor 1110, a memory 1120, and a radio frequency (RF) unit 1130. The device 1100 may be a base station, a relay station, or a UE. The processor 1110 performs a proposed function, process and/or method.

The RF unit 1130 is connected to the processor 1110 and transmits and receives radio signals. The memory 1120 may store information necessary for driving the processor 1110 and/or the RF unit 1130.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for transmitting downlink control information (DCI) in a wireless communication system, the method comprising:

determining a size of a first DCI format used for sidelink semi-persistent scheduling; and adjusting a size of a second DCI format, used for sidelink dynamic scheduling, to be equal to the size of the first DCI format,
wherein the first DCI format and the second DCI format are DCI formats sharing a search space, and
wherein the second DCI format is transmitted in the search space in which DCI format 0 used for scheduling of a physical uplink shared channel (PUSCH) is not present.

2. The method of claim 1, wherein the second DCI format is DCI format 5A used for scheduling of a physical sidelink control channel (PSCCH).

3. The method of claim 1, wherein the first DCI format and the second DCI format share the search space by having a same carrier indication field (CIF) value.

4. The method of claim 1, wherein when the second DCI format is DCI format 5A, a payload size of the DCI format 5A varies depending on a number of subchannels configured for a user equipment.

5. The method of claim 4, wherein the subchannels comprise a plurality of contiguous resource blocks (RBs).

6. A device for transmitting downlink control information (DCI) in a wireless communication system, the device comprising:
   a radio frequency (RF) unit to transmit and receive a radio signal; and
   a processor connected to the RF unit to operate,
   wherein the processor determines a size of a first DCI format used for sidelink semi-persistent scheduling and adjusts a size of a second DCI format, used for sidelink dynamic scheduling, to be equal to the size of the first DCI format, and
   the first DCI format and the second DCI format are DCI formats sharing a search space, and
   wherein the second DCI format is transmitted in the search space in which DCI format 0 used for scheduling of a physical uplink shared channel (PUSCH) is not present.

7. The device of claim 6, wherein the second DCI format is DCI format 5A used for scheduling of a physical sidelink control channel (PSCCH).

8. The device of claim 6, wherein the first DCI format and the second DCI format share the search space by having a same carrier indication field (CIF) value.

9. The device of claim 6, wherein when the second DCI format is DCI format 5A, a payload size of the DCI format 5A varies depending on a number of subchannels configured for a user equipment.

10. The device of claim 9, wherein the subchannels comprise a plurality of contiguous resource blocks (RBs).

11. An apparatus for transmitting downlink control information (DCI) in a wireless communication system, the apparatus comprising:
    at least one memory; and
    at least one processor connected to the at least one memory,
    wherein the processor is configured to:
    determine a size of a first DCI format used for sidelink semi-persistent scheduling, and
    adjust a size of a second DCI format, used for sidelink dynamic scheduling, to be equal to the size of the first DCI format,
    wherein the first DCI format and the second DCI format are DCI formats sharing a search space, and
    wherein the second DCI format is transmitted in the search space in which DCI format 0 used for scheduling of a physical uplink shared channel (PUSCH) is not present.

12. The apparatus of claim 11, wherein the second DCI format is DCI format 5A used for scheduling of a physical sidelink control channel (PSCCH).

13. The apparatus of claim 11, wherein the first DCI format and the second DCI format share the search space by having a same carrier indication field (CIF) value.

14. The apparatus of claim 11, wherein when the second DCI format is DCI format 5A, a payload size of the DCI format 5A varies depending on a number of subchannels configured for a user equipment.

15. The apparatus of claim 14, wherein the subchannels comprise a plurality of contiguous resource blocks (RBs).

* * * * *